2,774,658
HERBICIDAL ALKYL-AMINO-PHOSPHONIUM HALIDES

William T. Dye, Jr., Decatur, Ala., assignor to Monsanto Chemical Company, St. Louis, Mo., a corporation of Delaware No Drawing. Application August 30, 1955, Serial No. 531,571

12 Claims. (Cl. 71—2.7)

The present invention relates to nitrogenous organic compounds of phosphorus, and provides new phosphonium halides, methods of producing the same, herbicidal compositions comprising the new compounds and methods of destroying undesirable plants in which such compositions are employed.

According to the invention there are provided new and valuable quaternary phosphonium halides having the formula

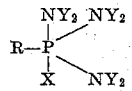

in which R is an alkyl radical of from 6 to 22 carbon atoms, X is selected from the class consisting of chlorine and bromine and Y is an alkyl radical of from 1 to 4 carbon atoms. The new compounds are alkyltris(dialkylamino)phosphonium chlorides or bromides in which the alkyl radical linked to the phosphorus atom has from 6 to 22 carbon atoms and in which each of the alkyl radicals which are linked to the nitrogen atom has from 1 to 4 carbon atoms. They are readily obtainable by contacting an alkyl chloride or bromide of from 6 to 22 carbon atoms with a hexaalkylphosphorous triamide in which each alkyl radical has from 1 to 4 carbon atoms, the reaction occurring by addition, substantially according to the scheme:

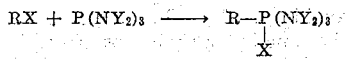

in which R, X and Y are defined above.

Alkyl halides useful for the preparation of the present phosphonium compounds are, e. g., n-hexyl chloride, 2-ethylhexyl bromide, n-decyl bromide, n-tetradecyl chloride, cetyl chloride, octadecyl bromide, eicosyl bromide, docosyl chloride, etc. Hexaalkylphosphorous triamides which may be reacted with these alkyl halides to yield the phosphonium compounds include hexamethylphosphorous triamide, hexaethylphosphorous triamide, hexaisopropylphosphorous triamide, hexa-n-butylphosphorous triamide, etc. Examples of phosphonium halides provided by the present invention are n-hexyltris(dipropylamino)phosphonium chloride, n-heptyltris(dimethylamino)phosphonium bromide, 2-ethylhexyltris(dimethylamino)phosphonium chloride, undecyltris(diethylamino)phosphonium bromide, n-dodecyltris(dimethylamino)phosphonium chloride, n-tetradecyltris(di-n-butylamino)phosphonium chloride, octadecyltris(dimethylamino)phosphonium chloride, eicosyltris(dimethylamino)phosphonium chloride, etc.

Reaction of the hexaalkylphosphorous triamide with the alkyl halide to yield the present phosphonium halides is effected readily by simply contacting the triamide with the halide at ordinary or increased temperature and allowing the resulting mixture to stand until the phosphonium halide has been formed. Generally, reaction temperatures of from 80° C. to 250° C. give optimum yields, the higher temperatures within this range being particularly useful for the chlorides. With the bromides, good results are obtained at from 80° C. to 160° C. The resulting reaction mixture generally consists of a crude grade of the alkyltris(dialkylamino)phosphonium halide, the phosphonium compound being admixed with small quantities of unreacted initial reactants and color-forming by-product impurities. This crude, or technical grade of the alkyltris(dialkylamino)phosphonium halide may be purified, if desired, by customary extracting, recrystallizing or vacuum distilling procedures. Generally, the phosphonium compound is readily purified by mixing the technical product with a liquid which is a solvent for the phosphonium compound and precipitating the phosphonium compound from the resulting solution by addition of a non-solvent such as ether. For many purposes, however, and particularly when the phosphonium compounds are to be employed as herbicides, the purifying procedure is unnecessary, since the crude product possesses substantially the herbicidal efficiency of the purified product.

Since formation of the present alkyltris(dialkylamino)phosphonium halides proceeds by addition of one mole of the alkyl halide to one mole of the triamide, these reactants are advantageously employed in stoichiometric proportions. However, an excess of either reactant may be used since any unreacted halide or unreacted triamide may be readily separated from the final product. The reaction may be effected batchwise, whereby the halide is mixed with the triamide and the resulting mixture is allowed to stand until the addition reaction is substantially completed; or the reaction may be conducted by a continuous process, whereby the reactants are gradually introduced into a reaction vessel or zone, while removing the alkyltris(dialkylamino)phosphonium halide as it is formed. The addition reaction may be carried out in the presence or absence of an inert diluent; and in some instances, the use of super-atmospheric pressures may be desirable.

The present alkyltris(dialkylamino)phosphonium halides are generally water-soluble, waxy to crystalline solids, depending upon the carbon content of the alkyl radicals present in the individual compounds as well as upon the purity of the compounds. The pure compounds are generally white or colorless crystals. Both the crude and the pure products are highly deliquescent when exposed to moisture, susceptibility to deliquescence diminishing with increasing purity and with increasing carbon content of the alkyl halide used.

The present phosphonium halides are useful for a wide variety of industrial and agricultural purposes. Compounds in which the long-chain alkyl radical has from 10 to 22 carbon atoms are useful as surface-active agents, as lubricant additives and as fungistats, insecticides, and nematocides. Compounds in which the higher alkyl radical has from 6 to 22 carbon atoms are particularly valuable as herbicides and as bacteriostats.

The present invention is illustrated, but not limited, by the following examples:

*Example 1*

Cetyl bromide (76.2 g., 0.25 mole) was mixed with hexamethyl phosphorous triamide (40.8 g., 0.25 mole) and mixture was slowly heated, with gentle stirring, to a temperature of 140° C., at which temperature an exothermic reaction was evident. External heating was then discontinued and the temperature of the reaction mixture was held at 140° C. to 145° C. for about 5 minutes by very moderate water-bath cooling. Heating was resumed, and stirring was continued for 2 hours at 140–145° C. The reaction mixture was then allowed to cool, whereby it was transformed to a brown, soap-like solid. This was dissolved in 100 cc. of hot dioxane, and the resulting solution was cooled and treated with ether to precipitate the almost white, crystalline cetyltris(dimethylamino)phosphonium bromide, which after a repeated crystallization from dioxane and ether, subsequent ether washing and vacuum drying was found to soften at 68° C., melt at 72° C. to 76° C. and analyze as follows:

|  | Found | Calcd. for $C_{22}H_{51}N_3BrP$ |
|---|---|---|
| Percent Br (ionic) | 18.43 | 17.08 |
| Percent N | 8.60 | 8.98 |

*Example 2*

A mixture consisting of 69.2 g. (0.25 mole) of n-tetradecyl bromide and 40.8 g. (0.25 mole) of hexamethylphosphorous triamide was slowly introduced, with stirring, during one hour, into a vessel which was partially immersed in a bath held at a temperature of from 145° C. to 150° C. During this time there was very moderate evolution of reaction heat. The mixture was then heated for an additional 15 minutes, cooled slowly to approximately 40° C., and then diluted with 300 cc. of dry ether. Stirring of the resulting gummy mass transformed it into a slurry of nearly white, lustrous crystals. This was allowed to stand overnight and then filtered. The precipitate was purified by solution in dioxane and reprecipitation with ether. Copious rinsing of the purified product with ether and subsequent vacuum drying yielded the white, crystalline n-tetradecyltris(dimethylamino)phosphonium bromide, softening from 90° C., melting at 105–13° C., and analyzing as follows:

|  | Found | Calcd. for $C_{20}H_{47}N_3BrP$ |
|---|---|---|
| Percent Br (ionic) | 17.53 | 18.16 |
| Percent N | 9.35 | 9.54 |

*Example 3*

This example shows the preparation of a technical grade of n-tetradecyltris(dimethylamino)phosphonium bromide. n-Tetradecyl bromide (69.2 g., 0.25 mole) and hexamethylphosphorous triamide (40.8 g., 0.25 mole) were placed in a 100 cc. flask. The flask was swept with nitrogen and the contents were slowly heated by means of a mantle to 110° C. External heating was discontinued, but the temperature of the reaction mixture rose to 140° C.–145° C. It was held at this temperature for about 5 minutes, at the end of which time the reaction subsided. Heating was then resumed and the reaction mixture was held at 140° C.–145° C. for another hour. The tan soap-like solid obtained upon cooling was a technical grade of n-tetradecyltris(dimethylamino)phosphonium bromide possessing the herbicidal properties shown in Example 13.

*Example 4* n-Tetradecyl bromide (69.2 g., 0.25 mole) and hexamethylphosphorous triamide (40.8 g., 0.25 mole) were heated together at a temperature of 110° C. for 45 minutes and then at 145° C. for 15 minutes. The amber, waxy solid, which was obtained upon cooling the reaction mixture, was n-tetradecyltris(dimethylamino)phosphonium bromide of a technical grade. As shown in Example 13 this product was found to possess very good herbicidal properties.

*Example 5*

A mixture consisting of 62.2 g. (0.25 mole) of n-dodecyl bromide and 40.8 g. (0.25 mole) of hexamethylphosphorous triamide was slowly heated to a temperature of 140° C. in a nitrogen atmosphere and held at this temperature for about an hour. The product thus obtained comprised n-dodecyltris(dimethylamino)phosphonium bromide of a technical grade. Evaluation of the product as a herbicide is shown in Example 13.

*Example 6*

This example is like Example 5 except that instead of employing the dodecyl bromide there was used 55.2 g. (0.25 mole) of n-decyl bromide. The product obtained was n-decyltris(dimethylamino)phosphonium bromide of a technical grade. Evaluation of the product as a herbicide is shown in Example 13.

*Example 7*

A mixture consisting of 48.2 g. (0.35 mole) of n-octyl bromide and 40.8 g. (0.25 mole) of hexamethylphosphorous triamide was warmed to a temperature of 110° C. at which temperature two layers gradually formed and a mildly exothermic reaction was evidenced. The temperature of the stirred reaction mixture remained at 110° C.–115° C. for about 25 minutes during which time no external heating was employed. After this time, the reaction mixture became completely homogeneous and the temperature began to fall. The mixture was then heated to a temperature of 110–115° C., with stirring for 30 minutes and allowed to cool. The cooled product consisted of the light amber n-octyltris(dimethylamino)phosphonium bromide. It possessed the herbicidal properties shown in Example 13.

*Example 8*

A mixture consisting of 41.2 g. (0.25 mole), of n-hexyl bromide and 40.8 g. (0.25 mole), of hexamethylphosphorous triamide was allowed to stand at room temperature for about 24 hours, heated to 105° C., and then held at a temperature of from 105° C.–110° C. for 30 minutes. The reaction mixture at this point changed to a homogeneous solution, and reaction became more vigorous. The solution was held at 110° C., first with air-cooling and then with slight warming for another 15 minutes without further evidence of reaction. The product, a clear, lemon-yellow liquid which, upon standing, crystallized to a white solid, comprised the substantially pure n-hexyltris(dimethylamino)phosphonium bromide, analyzing 23.5% ionic bromide (calcd. Br. for $C_{12}H_{31}N_3BrP$, 24.35%). Evaluation of the compound for herbicidal activity gave the values shown in Example 13.

*Example 9*

Cetyl bromide (76.2 g., 0.25 mole) and 40.8 g. (0.25 mole), of hexamethylphosphorous triamide were placed in a 500 cc. flask. The flask was swept with nitrogen, stoppered, and allowed to stand overnight at room temperature. The resulting slurry of white, flaky precipitate showed that a considerable amount of cetyltris(dimethylamino)phosphonium bromide had been formed. In order to assure complete reaction, the slurry was gradually brought to a temperature of 140° C. to 145° C. and held at this temperature for one hour. The tan, soap-like solid to which the reaction mixture was transformed upon cooling was a technical grade of cetyltris(dimethylamino)phosphonium bromide possessing the herbicidal properties shown in Example 13.

*Example 10* n-Heptyl bromide (0.25 mole, 44.8 g.) was mixed with 0.25 mole (40.8 g.) of hexamethylphosphorous triamide, and the resulting mixture was allowed to stand overnight. During this time about a gram of white flakes of the quaternary phosphorus salt was found. The mixture was heated to 105° C., and then held at a temperature of from 105° C.–110° C. by moderate air-cooling for a period of 25 minutes. Air-cooling was discontinued for a few minutes and the temperature allowed to climb to a peak of 130° C., at which point the reaction solution was almost homogeneous. After a short time, the reaction mixture was allowed to cool to room temperature. The resulting light tan, waxy solid was n-heptyltris(dimethylamino)phosphonium bromide, having the herbicidal properties shown in Example 13.

Example 11

A mixture consisting of 0.25 mole (51.7 g.) of 3,5,5-trimethylhexyl bromide and 0.25 mole (40.8 g.) of hexamethylphosphorous triamide was allowed to stand for 2 hours, and the resulting cloudy solution was heated to a temperature of 145° C., at which point vigorous reaction was noted. The reaction temperature was maintained at 145° C.–150° C. by air-cooling and after a few minutes, when no further reaction was evidenced, the light amber liquid was allowed to cool. The resulting crystalline product was the substantially pure 3,5,5-trimethylhexyltris(dimethylamino)phosphonium bromide having the herbicidal properties shown in Example 13.

Example 12 n-Hexadecyl chloride (0.25 mole, 52 g.) was mixed with hexamethylphosphorous triamide (32.6 g., 0.25 mole) the mixture was allowed to stand overnight without reaction, heated to 208° C., and then held at that temperature for about 40 minutes. The resulting reaction mixture was cooled, treated with 100 cc. of dioxane and a small amount of charcoal, and filtered. Addition of a large volume of ether caused separation of solids (probably amine hydrochloride) from a dark oil. After decanting the ether and removing the solids by filtration the residual oily material was washed several times with ether and dried in a vacuum-oven overnight at a temperature of 65° C. The dark brown viscous liquid, water-soluble and surface-active, was a crude grade of n-hexadecyltris(dimethylamino)phosphonium chloride. It was found to have the herbicidal properties shown in Example 13.

Example 13

Respective cyclohexanone solutions of each of the phosphonium compounds were prepared and the resulting solutions and an emulsifying agent were respectively added to water, the quantity of solution employed being calculated to give respective emulsions containing 1.0 percent and 0.3 percent of the phosphonium compound, based on the total weight of the emulsion. The quantity of emulsifying agent used was 0.2 percent by weight, based on the weight of the emulsion; and the emulsifying agent which was used was "Emulsifier L" (reputed to be a mixture of a polyalkylene glycol derivative and an alkylbenzenesulfonate). Three-week old corn and bean plants were respectively sprayed with said emulsions, two plants of each variety being employed for each test emulsion, until droplets formed on and/or fell from the foliage and stems of the sprayed plants, up to 15 ml. of the emulsion being applied to each plant. The sprayed plants as well as two untreated "blank specimens" of each plant were then allowed to remain under standard conditions of sunlight and watering for a period of one week. At the end of that time observation of the plants showed the following:

| Compound Tested | Extent [1] of Injury on— | | | |
|---|---|---|---|---|
| | Bean | | Corn | |
| | 1.0% | 0.3% | 1.0% | 0.3% |
| n-Hexyltris (dimethylamino)-phosphonium bromide | 4, 4a, 4b | 3 | 3, 4a | 2 |
| n-Heptyltris (dimethylamino)-phosphonium bromide | 4, 4a | 3 | 4, 4a | 3 |
| n-Octyltris (dimethylamino)-phosphonium bromide | 4, 4a | 3 | 4, 4a | 3 |
| n-Decyltris (dimethylamino)-phosphonium bromide | 4, 4a | 3 | 4, 4a | 3 |
| n-Dodecyltris (dimethylamino)-phosphonium bromide | 4, 4a | 3 | 4, 4a | 3 |
| n-Tetradecyltris (dimethylamino)-phosphonium bromide | 4, 4a, 4b | 3, 4a | 4, 4a | 4, 4a |
| Cetyltris (dimethylamino)-phosphonium chloride | 4, 4a, 4b | 3 | 4, 4a | 3 |
| "Blank" test specimens | Excellent Condition | | | |

[1] 4=plant dead; 4a=leaves dried; 4b=leaves dropped; 3=severe injury; 2=moderate injury; 1=slight effect.

Example 14

Testing for insecticidal activity of the n-hexadecyltris-(dimethylamino)phosphonium bromide of Example 12 was conducted as follows:

The test chemical was dissolved in acetone to make 70.0 ml. of a 1% solution; and this was further diluted to make 50 ml. of a 0.1% solution. Petri dishes were respectively sprayed in a Hoskins horizontal spray chamber by means of a modified Potter sprayer with 20 ml. of the respective solutions for 15 seconds at a pressure of 20 p. s. i. Two dishes were sprayed with each solution to provide duplicates. An additional period of 30 seconds was allowed for settling of the mist, and the open dishes were then held for 24 hours. At the end of this time 10 fourth instar large milkweed bug nymphs (*Oncepeltus fasciatus*) were placed in each of the thus treated dishes, as well as in dishes which had been sprayed with acetone in absence of the test chemical and which were used as "blanks." The dishes were then held uncovered at room temperature for 48 hours. At the end of this time there was noted a 100% kill of the insects at both the 1.0% and the 0.1% concentrations of the n-hexadecyltris(dimethylamino)phosphonium bromide, whereas the insects on the "blank" dishes were unaffected.

Example 15

The n-tetradecyltris(dimethylamino)phosphonium bromide of Example 2 was tested against spores of the fungus *Monilinia fructiola* by placing said spores of said slides which had been sprayed with a solution of said bromide and dried so as to give the following concentrations of the test chemical on the slides: 6 p. p. m., 12 p. p. m., 25 p. p. m., and 50 p. p. m. Incubation of the deposited spores in a mist chamber for sixteen hours showed no germination of the spores at each of the test concentrations, whereas spores deposited on untreated slides and similarly incubated showed profuse growth.

Since the present phosphonium halides are active in very small concentrations, they preferably are incorporated into an inert carrier when employed as biological toxicants. Aqueous solutions, water-in-oil and oil-in-water emulsions, and solutions of the present compounds in organic solvents may be prepared. The present compounds are preferably employed by using the solutions or emulsions as sprays, this method affording an easy and inexpensive way of application. However, they are likewise effective when applied as dusts, i. e., in admixture with such carriers as clay, lime, talc, bentonite, pumice, fuller's earth, etc.

This application is a continuation-in-part of my application Serial No. 239,175 filed July 28, 1951, now abandoned.

What I claim is:

1. Phosphonium halides having the general formula

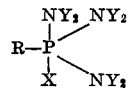

in which R is an alkyl radical of from 6 to 22 carbon atoms, X is selected from the class consisting of chlorine and bromine and Y is an alkyl radical of from 1 to 4 carbon atoms.

2. Cetyltris(dimethylamino)phosphonium bromide.

3. n-Tetradecyltris(dimethylamino)phosphonium bromide.

4. n-Dodecyltris(dimethylamino)phosphonium bromide.

5. n-Decyltris(dimethylamino)phosphonium bromide.

6. n-Octyltris(dimethylamino)phosphonium bromide.

7. A method of destroying undesirable plants which comprises contacting said plants with a herbicidal composition comprising an inert carrier and as the essential active ingredient, in a quantity which is injurious to said plants, a phosphonium halide having the formula

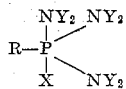

in which R is an alkyl radical of from 6 to 22 carbon atoms, X is selected from the class consisting of chlorine and bromine and Y is an alkyl radical of from 1 to 4 carbon atoms.

8. A method of destroying undesirable plants which comprises contacting said plants with a herbicidal composition comprising an inert carrier and cetyltris(dimethylamino)phosphonium bromide as the essential active ingredient, in a quantity which is injurious to said plants.

9. A method of destroying undesirable plants which comprises contacting said plants with a herbicidal composition comprising an inert carrier and n-tetradecyltris-(dimethylamino)phosphonium bromide as the essential active ingredient, in a quantity which is injurious to said plants.

10. A method of destroying undesirable plants which comprises contacting said plants with a herbicidal composition comprising an inert carrier and n-dodecyltris-(dimethylamino)phosphonium bromide as the essential active ingredient, in a quantity which is injurious to said plants.

11. A method of destroying undesirable plants which comprises contacting said plants with a herbicidal composition comprising an inert carrier and n-decyltris(dimethylamino)phosphonium bromide as the essential active ingredient, in a quantity which is injurious to said plants.

12. A method of destroying undesirable plants which comprises contacting said plants with a herbicidal composition comprising an inert carrier and n-octyltris-dimethylamino)phosphonium bromide as the essential active ingredient, in a quantity which is injurious to said plants.

References Cited in the file of this patent
UNITED STATES PATENTS

| | | |
|---|---|---|
| 1,990,609 | Meis | Feb. 12, 1935 |
| 2,146,584 | Lipkin | Feb. 7, 1939 |
| 2,160,841 | Dreyfus | June 6, 1939 |
| 2,703,814 | Dye | Mar. 8, 1955 |

FOREIGN PATENTS

| | | |
|---|---|---|
| 201,549 | Switzerland | Mar. 1, 1939 |

OTHER REFERENCES

Kosolapoff: "Organo-Phosphorus Compounds" (1950), p. 327.

Michaelis et al.: Ber. Deut. Chem., vol. 28 (1895), pp. 2205–11.

Michaelis: "Liebigs Annalen," vol. 326 (1903), pp. 169–71.

Thompson et al.: Botanical Gazette, vol. 107 (1946), pp. 476–507.